(12) United States Patent
Rodatz et al.

(10) Patent No.: US 10,301,997 B2
(45) Date of Patent: May 28, 2019

(54) METHOD FOR CHECKING A TEMPERATURE SENSOR IN AN SCR EXHAUST GAS POST-TREATMENT SYSTEM

(71) Applicant: Continental Automotive GmbH, Hannover (DE)

(72) Inventors: Paul Rodatz, Landshut (DE); Michael Nienhoff, Regensburg (DE); Ingo Koops, Regensburg (DE); Tino Arlt, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 388 days.

(21) Appl. No.: 15/104,042

(22) PCT Filed: Dec. 17, 2014

(86) PCT No.: PCT/EP2014/078196
§ 371 (c)(1),
(2) Date: Jun. 13, 2016

(87) PCT Pub. No.: WO2015/091630
PCT Pub. Date: Jun. 25, 2015

(65) Prior Publication Data
US 2016/0356193 A1     Dec. 8, 2016

(30) Foreign Application Priority Data
Dec. 20, 2013   (DE) .................. 10 2013 226 796

(51) Int. Cl.
F01N 3/028     (2006.01)
F01N 3/20      (2006.01)
F01N 11/00     (2006.01)

(52) U.S. Cl.
CPC ............ *F01N 3/208* (2013.01); *F01N 11/002* (2013.01); *F01N 2240/16* (2013.01);
(Continued)

(58) Field of Classification Search
CPC ...... F01N 3/028; F01N 11/00; F01N 2550/02; F01N 2550/10; F01N 2900/1402;
(Continued)

(56) References Cited

U.S. PATENT DOCUMENTS

| 5,153,835 A | 10/1992 | Hashimoto et al. .......... 701/114 |
| 6,908,225 B2 | 6/2005 | Tsukamoto et al. .............. 374/1 |

(Continued)

FOREIGN PATENT DOCUMENTS

| CN | 101910574 A | 12/2010 | .............. F01N 3/00 |
| DE | 102004008142 A1 | 9/2004 | .............. F01P 11/16 |

(Continued)

OTHER PUBLICATIONS

International Search Report and Written Opinion, Application No. PCT/EP2014/078196, 22 pages, dated Feb. 11, 2015.
(Continued)

*Primary Examiner* — Patrick D Maines
(74) *Attorney, Agent, or Firm* — Slayden Grubert Beard PLLC

(57) ABSTRACT

The present disclosure describes a method for checking the signal of a temperature sensor in an exhaust-gas aftertreatment system for an internal combustion engine. The method may include: in an operating state which does not require heating of the reducing agent, activating the heating device for the purposes of checking the temperature sensor; determining whether the signal of the temperature sensor changes by a predefined expected value ($\Delta T$) within a predefined time period ($\Delta t2$); provisionally identifying the temperature sensor as fault-free if it does; deactivating the heating device; determining whether the signal of the temperature sensor reaches the start temperature (T0) again within a time period ($\Delta t3$); and confirming the temperature sensor as fault-free if it does.

7 Claims, 2 Drawing Sheets

(52) U.S. Cl.
CPC ...... *F01N 2550/05* (2013.01); *F01N 2560/06* (2013.01); *F01N 2610/02* (2013.01); *F01N 2610/10* (2013.01); *F01N 2610/144* (2013.01); *F01N 2610/1406* (2013.01); *F01N 2610/148* (2013.01); *F01N 2900/0416* (2013.01); *F01N 2900/1811* (2013.01); *Y02T 10/24* (2013.01); *Y02T 10/47* (2013.01)

(58) Field of Classification Search
CPC ............ F01N 2900/1622; F01N 3/208; F01N 11/002; F01N 2550/05; F01N 2240/16
See application file for complete search history.

(56) References Cited

U.S. PATENT DOCUMENTS

| | | | |
|---|---|---|---|
| 7,912,360 B2 | 3/2011 | Gschwind | 392/456 |
| 8,201,577 B2 | 6/2012 | Bruhn et al. | 137/571 |
| 8,303,174 B2 | 11/2012 | Kasahara | 374/144 |
| 2005/0102076 A1 | 5/2005 | Kariya et al. | 701/30.2 |
| 2007/0251226 A1* | 11/2007 | Kaneko | F01N 3/208 60/317 |
| 2008/0236153 A1* | 10/2008 | St. Aubin | F15B 21/042 60/327 |
| 2010/0134120 A1 | 6/2010 | Barcin et al. | 324/537 |
| 2010/0280788 A1* | 11/2010 | Bohan | G01K 3/10 702/130 |
| 2011/0225950 A1* | 9/2011 | McCoy | F01N 3/2066 60/274 |
| 2012/0275773 A1* | 11/2012 | Floyd | F01N 3/2066 392/441 |
| 2013/0061574 A1* | 3/2013 | Minezawa | F01N 3/208 60/277 |
| 2014/0053537 A1* | 2/2014 | Yan | F01N 3/2066 60/286 |
| 2016/0356193 A1 | 12/2016 | Rodatz et al. | 60/274 |

FOREIGN PATENT DOCUMENTS

| | | | | |
|---|---|---|---|---|
| DE | 102007005004 A1 | 8/2008 | ............ | F01N 3/029 |
| DE | 102008061471 A1 | 6/2010 | ............ | F01N 3/10 |
| DE | 102012103520 A1 | 10/2013 | ............ | B60R 16/02 |
| EP | 1385073 A2 | 1/2004 | ........... | F02M 31/125 |
| EP | 1767417 A1 | 3/2007 | ............ | B60S 1/48 |
| EP | 1876334 A1 | 1/2008 | ............ | F01N 11/00 |
| EP | 2133527 A1 | 12/2009 | ............ | B01D 53/94 |
| EP | 2560458 A1 | 2/2013 | ............ | H05B 1/02 |
| JP | 2006316722 A | 11/2006 | ............ | F01N 13/00 |
| WO | 2006/090182 A1 | 8/2006 | ............ | F16L 11/12 |
| WO | 2015/091630 A1 | 6/2015 | ............ | F01N 11/00 |

OTHER PUBLICATIONS

Chinese Office Action, Application No. 201480056969.9, 11 pages, dated Jul. 25, 2017.

* cited by examiner

METHOD FOR CHECKING A TEMPERATURE SENSOR IN AN SCR EXHAUST GAS POST-TREATMENT SYSTEM

CROSS-REFERENCE TO RELATED APPLICATIONS

This application is a U.S. National Stage Application of International Application No. PCT/EP2014/078196 filed Dec. 17, 2014, which designates the United States of America, and claims priority to DE Application No. 10 2013 226 796.7 filed Dec. 20, 2013, the contents of which are hereby incorporated by reference in their entirety.

TECHNICAL FIELD

The present disclosure generally relates to checking a temperature sensor and may have more specific application for use in an SCR exhaust-gas after treatment system of an internal combustion engine.

BACKGROUND

For the reduction of pollutants, in particular for the reduction of nitrogen oxides, various methods have become established in the case of which reducing fluids (gases or liquids) are introduced into the exhaust system of an internal combustion engine.

In particular, for the reduction of nitrogen oxides, SCR (Selective Catalytic Reduction) has proven successful, in the case of which nitrogen oxides ($NO_X$) contained in the oxygen-rich exhaust gas are selectively reduced to form nitrogen and water, with the aid of ammonia or a corresponding precursor substance that can be converted into ammonia. Aqueous urea solutions may be used. The urea solution is hydrolyzed by way of hydrolysis catalytic converters or directly on the SCR catalytic converter to form ammonia and carbon dioxide. For this purpose, the urea solution is carried in one or more tanks and is conducted by way of a delivery device to a dosing system which introduces the urea solution into the exhaust-gas stream upstream of the hydrolysis catalytic converter or upstream of the SCR catalytic converter.

As a reducing agent, an aqueous urea solution with a urea content of 31.8-33.2 percent by weight, which is marketed under the trademark "AdBlue" may be used. As in the case of other reducing agent solutions, however, this urea solution is also afflicted with a relatively low freezing point (−11.5° C.). Once frozen, a reducing agent can no longer be delivered to the catalytic converter. This results, in particular in winter, in potential failure of the exhaust-gas aftertreatment system, as a result of which inadmissibly high emissions of harmful exhaust-gas components can occur. Furthermore, the volume of the aqueous urea solution increases by approximately 10% when it freezes. This can result in damage to the individual components of the SCR exhaust-gas aftertreatment system.

The EC Regulation no. 692/2008 prescribes that, for vehicles which require a reagent for their exhaust-gas aftertreatment system, said system must perform its emissions reduction function even at low ambient temperatures. This also includes measures for preventing complete freezing of the reagent over a parking duration of up to 7 days at −15° C. in the case of a tank fill level of 50%.

If the reagent has frozen, it must be ensured that said reagent is available for use, in order that the emissions reduction system can operate correctly, within 20 minutes after starting of the vehicle in the case of a temperature of −15° C. having been measured in the reagent vessel.

For the starting of operation and correct functioning of an exhaust-gas aftertreatment system of said type, it is therefore necessary for the tank in particular to be equipped with heating systems which melt the frozen liquid in the tank and change said reagent into a liquid, that is to say flowable, state of aggregation.

Systems are already known from the prior art which encase liquid tanks in motor vehicles with heating foils or heating mats in order to thaw the frozen liquid in the tank. Heating foils or heating mats arranged on the outside on the tank wall however exhibit low efficiency, because a major part of the heat generated is not conducted into the tank so as to melt the frozen liquid but is dissipated into the tank surroundings as power losses. Therefore, an increase either of the heating temperature and/or of the activation time of the heater is necessary in order that the tank, or at least that part of the tank from which the reducing agent is extracted, is heated such that the reducing agent is thawed, or thaws, adequately quickly and thus remains in the flowable state of aggregation (EP 1 767 417 A1, DE 10 2007 005 004 A1).

Furthermore, it is known from the prior art for not only the tank but also at least a part of the reducing agent lines, the reducing agent pump, the reducing agent filter and/or the reducing agent injector may be heated (DE 10 2008 061 471 A1, WO 2006/90182 A1, EP 2 133 527 A1).

SUMMARY OF THE INVENTION

To thaw frozen reducing agent or to slow or prevent freezing of the reducing agent, the heating of the stated components of the SCR exhaust-gas aftertreatment system is generally activated only if a temperature sensor installed in said system indicates a temperature value close to or below the freezing point of the reducing agent.

Since the signal of a temperature sensor of said type is used as a criterion for the activation of the heating device, and thus has an influence on the emission characteristics of the internal combustion engine, the temperature sensor must be diagnosed with regard to its functionality.

Until now, the temperature sensor has been checked with regard to implausible values, that is to say excessively low or excessively high temperature values, or physically impossible temperature values. Alternatively or in addition, a plausibility check may be performed using the values of other temperature sensors, for example the values of a coolant temperature sensor or the values of an ambient temperature sensor. Using the first method, only values outside the admissible temperature range can be identified as erroneous. In the case of the second method, it is likewise necessary for large deviations to be tolerated, because owing to the low temperature dynamics in the SCR exhaust-gas aftertreatment system, large differences in relation to the values of the other temperature sensors used for comparison are possible even in the fault-free state.

In particular if the reducing agent tank is protected by way of thermal insulation in order to keep heat losses low, this means that the temperature fluctuations are relatively small and highly inert. It is however therefore difficult to perform diagnosis of the temperature sensor because the change in signal is very small. In particular, a so-called "stuck temperature sensor" can be identified only with difficulty. In this context, a "stuck temperature sensor" is to be understood to mean a temperature sensor whose signal (measurement value) does not change, or changes only very slightly, over a relatively long time period, or which exhibits only low dynamics with regard to its output measurement value.

It is therefore an object of the present application to disclose a simple and improved method for the diagnosis of a temperature sensor in an SCR exhaust-gas aftertreatment system of an internal combustion engine.

The method may be used for checking the signal of a temperature sensor in an exhaust-gas aftertreatment system for an internal combustion engine, wherein the exhaust-gas aftertreatment system has at least a reduction catalytic converter, a reducing agent storage vessel for storing liquid reducing agent, a reducing agent pump, a dosing device for introducing the reducing agent into an exhaust line of the internal combustion engine, a supply line for supplying the reducing agent liquid from the reducing agent pump to the dosing device, and an electric heating device for heating at least a part of the reducing agent. The temperature sensor is arranged in the exhaust-gas aftertreatment system at a location which is situated downstream of the heating device as viewed in the flow direction of the reducing agent. The method may include the following steps: a) in an operating state of the internal combustion engine in which no heating of the reducing agent is required owing to the prevailing temperatures, the heating device is activated for the purposes of checking the temperature sensor, b) it is checked whether the signal of the temperature sensor, proceeding from a start temperature, changes by a predefined expected value within a predefined time period upon activation of the heating device, c) the temperature sensor is provisionally identified as being fault-free if the expected value is reached within the predefined time period, d) the heating device is deactivated, e) it is checked whether the signal of the temperature sensor, proceeding from the expected value, reaches the start temperature again within a time period, f) the temperature sensor is confirmed as being fault-free if the start value is reached within the predefined time period.

By way of the active activation of the heating device outside the heating window required in the presence of low temperatures for the prevention of the freezing of reducing agent or for the thawing of reducing agent that has already frozen, diagnosis of the temperature sensor can be performed independently of the external boundary conditions.

The teachings of the present disclosure makes it possible in a simple manner, and without the aid of additional components, such as for example temperature sensors installed elsewhere, for the temperature sensor arranged in the exhaust-gas aftertreatment system to be checked in a reliable manner.

Furthermore, the disclosed methods have the advantage that it is approximately independent of the fill level of the reducing agent storage vessel and of the start temperature during the diagnosis, as long as said start temperature merely lies above the freezing temperature of the reducing agent.

If the exhaust-gas aftertreatment system has a recirculation line for the reducing agent to the reducing agent storage vessel, it is possible, by way of the reducing agent pump, for the delivery rate to be regulated such that the temperature rise resulting from the active diagnostic heating and the associated time duration are optimally coordinated with one another.

In order to prevent possible erroneous assessment of the temperature sensor, not only the change in the temperature signal owing to the diagnostic heating but also the change in the temperature signal after the deactivation of the heating device are checked. By evaluating the gradient of the temperature drop after the deactivation of the heating device, it is possible to make a distinction between a faulty temperature sensor and a defective heating device.

To further increase the diagnostic certainty, it is the case in a refinement of the invention that the check is started only if the signal of the temperature sensor is constant or approximately constant over a predetermined time duration. It is ensured in this way that the temperature change detected by the temperature sensor originates exclusively from the activated heating device, and therefore foreign influences are virtually ruled out.

According to one aspect of the invention, the temperature drop after deactivation of the heating device proceeds with a gradient substantially equivalent to a gradient of the temperature rise.

According to another aspect of the invention, the temperature drop after deactivation of the hearing device proceeds with a gradient faster than a gradient corresponding to the temperature rise.

BRIEF DESCRIPTION OF THE DRAWINGS

Further advantageous refinements of the method will emerge in conjunction with the description of a various embodiments.

The invention will be discussed in more detail below with reference to the drawing, in which.

DETAILED DESCRIPTION OF THE DRAWINGS

Figure 1:
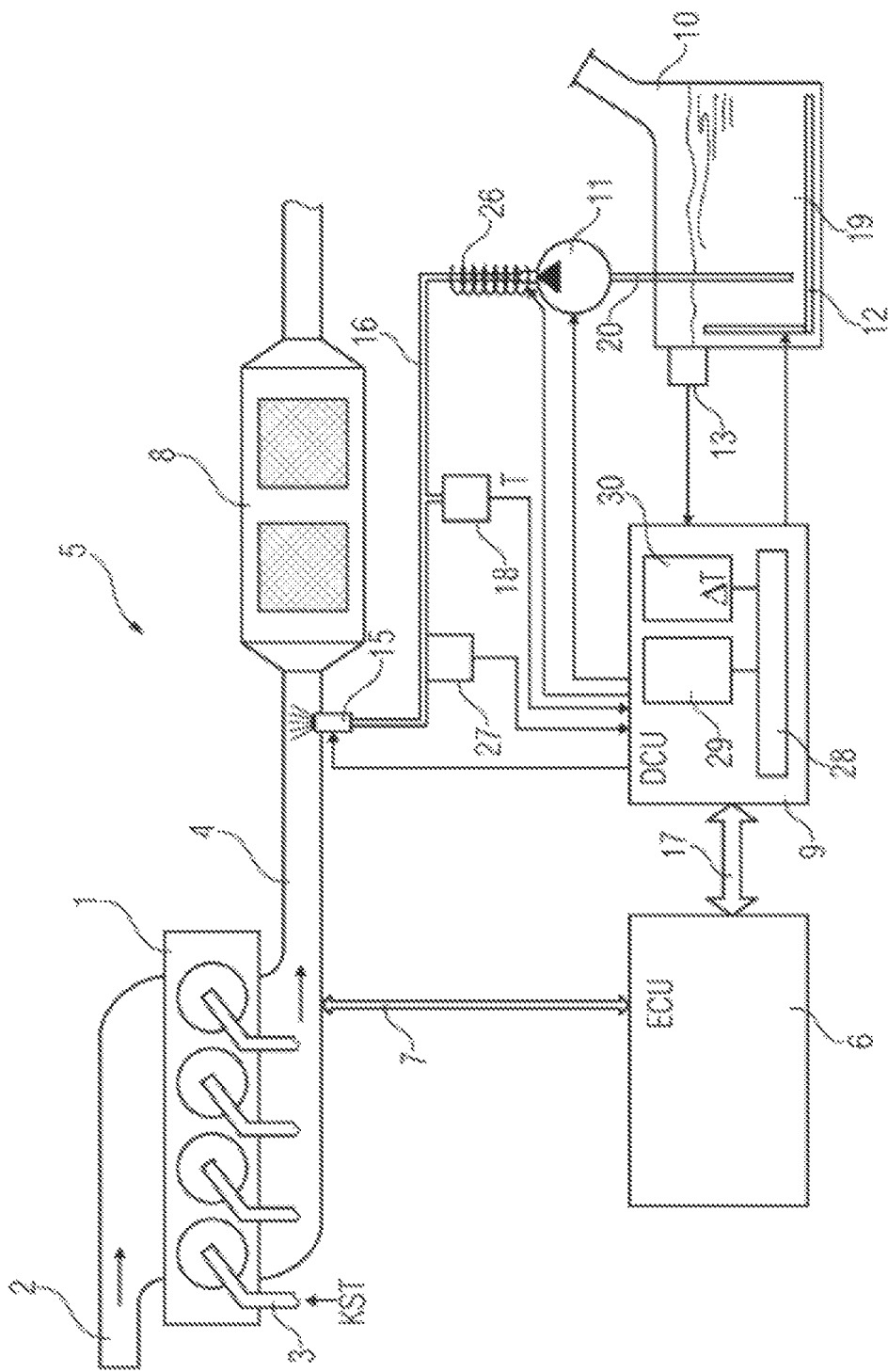
FIG. 1 is a block diagram of an internal combustion engine with associated SCR exhaust-gas aftertreatment system, in which the diagnostic method according to the invention is used.

FIG. 1 shows, in highly simplified form in a block diagram, an internal combustion engine which is operated at least intermittently with an excess of air, with an exhaust-gas aftertreatment system assigned thereto. Here, only those parts which are necessary for understanding the invention are illustrated. In particular, the fuel circuit has not been illustrated. In this exemplary embodiment, a diesel internal combustion engine is shown as an internal combustion engine, and aqueous urea solution is used as reducing agent for the aftertreatment of the exhaust gas. The method according to the invention may however also be used in the case of other types of internal combustion engines which are operated at least partially with an excess of air.

The air required for the combustion is supplied to the internal combustion engine 1 via an intake line 2. An injection system, which may for example be in the form of a high-pressure injection system (common rail) with injection valves which inject fuel KST directly into the cylinders of the internal combustion engine 1, is denoted by the reference designation 3. The exhaust gas of the internal combustion engine 1 flows via an exhaust line 4 to an exhaust-gas aftertreatment system 5, and from the latter into the atmosphere via a silencer (not illustrated).

For the control and regulation of the internal combustion engine 1, an electronic control device 6 such as is known per se, also referred to as engine controller or electronic control unit (ECU), is connected to the internal combustion engine 1 by way of an in this case merely schematically illustrated bus system 7 which comprises data and control lines. Via said bus system 7, signals inter alia from sensors such as for example load sensor, speed sensor and temperature sensors for intake air, charge air and coolant, and signals for actuators (for example injection valves, control elements), are transmitted between the internal combustion engine 1 and the control device 6.

The exhaust-gas aftertreatment system 5 has a reduction catalytic converter (SCR catalytic converter) 8 which comprises multiple catalytic converter units which are connected in series and which are not designated in any more detail. Downstream and/or upstream of the reduction catalytic converter 8 there may additionally be arranged in each case one oxidation catalytic converter (not illustrated).

A dosing control unit 9 (DCU), a reducing agent storage vessel 10, an electrically actuable reducing agent pump 11, and a dosing device 15 for the introduction of liquid reducing agent 19 into the exhaust line 4 upstream of the reducing agent catalytic converter 8, are also provided.

The reducing agent 19 (e.g., aqueous urea solution) is stored in the reducing agent storage vessel 10 and is supplied to the dosing device 15 as required. For this purpose, the reducing agent pump 11 is connected at the suction side to an extraction line 20 which projects into the reducing agent storage vessel 10, and at the pressure side via a supply line 16 to the dosing device 15.

On or in the reducing agent storage vessel 10 there is provided a sensor 13 for detecting the fill level of the reducing agent 19 in the reducing agent storage vessel 10. The signal from said sensor 13 is supplied to the dosing control unit 9.

The reducing agent vessel 10 has an electric heating device 12. Said heating device 12 may for example be in the form of a heating mat, heating foil, heating plate, heating bar, heating coil or heating loop, and serves for melting frozen reducing agent 19 within the reducing agent storage vessel 10.

Furthermore, at least a part of the supply line 16 also has an electric heating device 26. Said electric heating device may for example comprise a heating coil or a heated hose section. It can thus be ensured that reducing agent 19 still situated in the supply line 16 after the internal combustion engine 1 is shut down and after the reducing agent pump 11 is deactivated does not freeze, or can be thawed quickly after a restart. This is important in particular for systems in which said line branch is not evacuated by suction upon the shutdown of the internal combustion engine 1, for example because a reducing agent pump 11 is used which does not permit a reversal of direction of rotation.

Also provided in the supply line 16 is a pressure sensor 27 for detecting the reducing agent pressure and a temperature sensor 18 for detecting the temperature T of the reducing agent 19. The temperature sensor 18 is in this case arranged downstream of at least one part of the heating device 26, such that, upon activation of the heating device 26, the temperature behavior of the reducing agent 19 in response to said activation can be examined. The signals of said two sensors 18, 27 are supplied to the dosing control unit 9.

The dosing control unit 9 may comprise a processing unit (processor) 28 which is coupled to a program memory 29 and to a value memory (data memory) 30. In the program memory 29 and in the value memory 30, there are stored programs and values respectively which are required for the operation of the SCR exhaust-gas aftertreatment system 5.

The dosing control unit 9 is connected to the control device 6 for mutual data transfer by way of an electrical bus system 17. Those operating parameters of the internal combustion engine 1 which are relevant for the calculation of the amount of reducing agent 19 to be dosed, such as for example engine speed, intake air mass, injected fuel mass, control travel of an injection pump, exhaust-gas mass flow, operating temperature, charge-air temperature, start of injection etc. are transmitted to the dosing control unit 9 via the bus system 17.

On the basis of said parameters, the pressure in the supply line 16 and measurement values for the exhaust-gas temperature and the $NO_X$ content, the dosing control unit 9 calculates, in a known manner, the amount of reducing agent 19 to be injected, and outputs a corresponding electrical signal to the dosing device 15. The injection into the exhaust line 4 has the effect that the aqueous urea solution is hydrolyzed and thoroughly mixed. The catalytic reduction of the $NO_X$ in the exhaust gas to form $N_2$ and $H_2O$ takes place in the catalytic converter units of the reduction catalytic converter 8.

Figure 2:
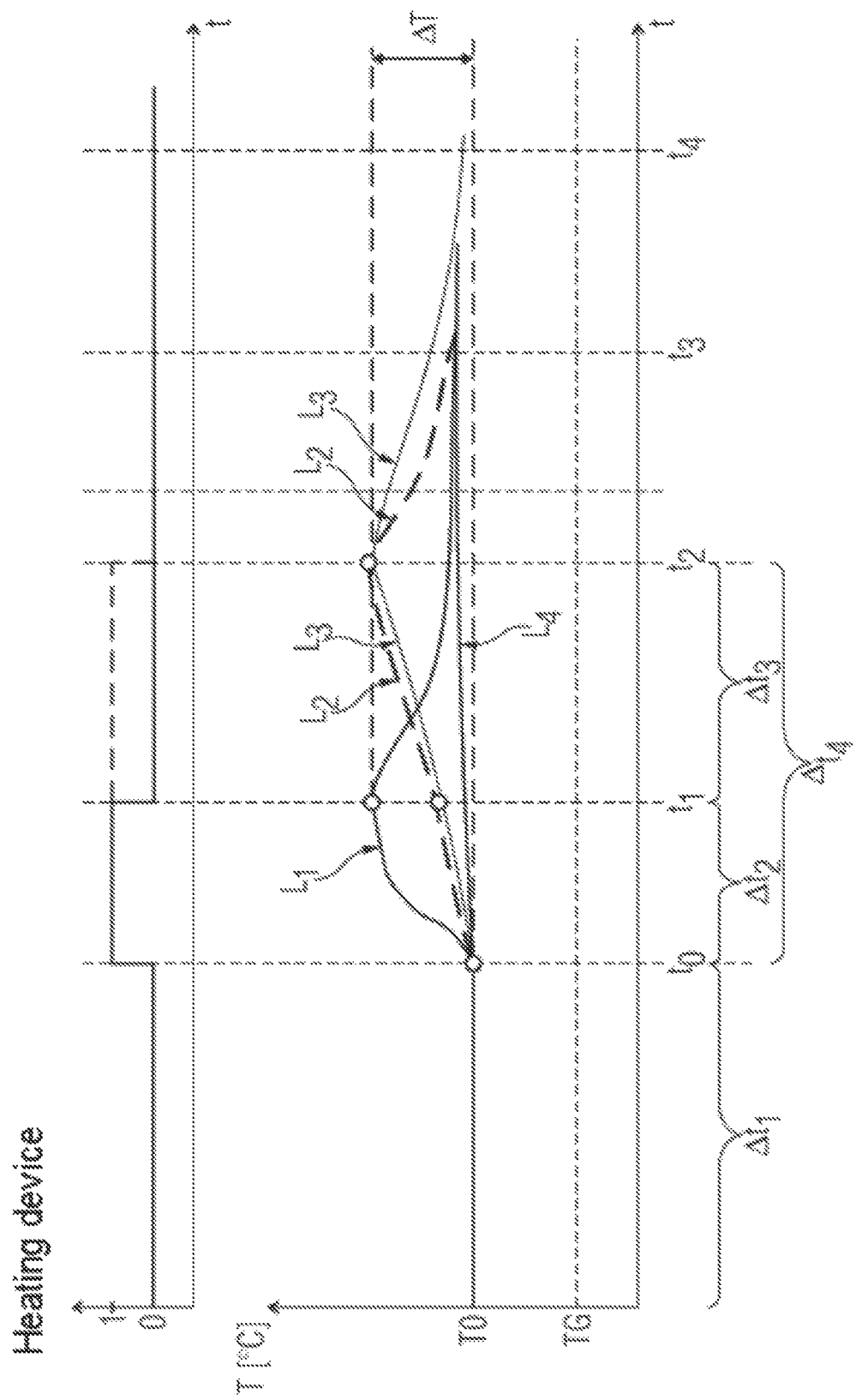
FIG. 2 shows a diagram with different temperature profiles for the purposes of illustrating the diagnostic method.

The dosing control unit 9 also controls and/or regulates the electric heating device 12 in the reducing agent storage vessel 10 and the electric heating device 26 in or on the supply line 16. Furthermore, a characteristic map-based function for the checking of the temperature sensor 18, as will be discussed in more detail on the basis of FIG. 2, is implemented as software in the program memory 29 of the dosing control unit 9.

The dosing device 15 for introducing the reducing agent 19 into the exhaust line 4 may advantageously be realized as a conventional low-pressure gasoline injection valve, which is slightly modified in terms of material selection, which is driven by way of a solenoid, and which is for example detachably fastened in a valve receiving device which is fixedly connected to a wall of the exhaust line 4.

In some embodiments of the dosing device 15, a nozzle may be provided, and in this case the metering of the reducing agent 19 is performed by actuation of the reducing agent pump 11 by way of corresponding signals from the dosing control unit 9.

In such embodiments, the control device 6 and the dosing control unit 9 are illustrated and described as independent components. This has the advantage that the SCR exhaust-gas aftertreatment system 5 can also be retrofitted into existing vehicle concepts. It is however also possible for the functionality of the dosing control unit 9 to be integrated into the control device 6 of the internal combustion engine 1, which yields a compact and inexpensive solution for the exhaust-gas aftertreatment system 5.

Furthermore, a further sensor (not illustrated) which detects the quality of the reducing agent may be provided in the exhaust-gas aftertreatment system 5. Said signal is also supplied to the dosing control unit 9 and taken into consideration in the calculation of the amount of reducing agent 19 to be injected.

The method for checking the temperature sensor 18 will be discussed in more detail on the basis of the diagrams in FIG. 2.

The method may be started if certain enable conditions are satisfied. The internal combustion engine 1 may be in an operating state which does not necessitate active heating of components of the exhaust-gas aftertreatment system 5. This is the case in particular if the outside temperature, more precisely the ambient temperature around the motor vehicle equipped with said exhaust-gas aftertreatment system 5, lies above the freezing temperature TG of the reducing agent 19. The stability of the signal of the temperature sensor 18 may be used as a further criterion for the enabling of the diagnosis. Only when the temperature signal has been at least approximately constant over a relatively long time duration and no change in said signal is foreseeable is the heating device 26 activated for the purposes of checking the temperature sensor 18.

The upper part of FIG. 2 illustrates the electrical actuation signal of the heating device 26, wherein the high level 1 is representative of an activated heating device 26, and the low level 0 is representative of a deactivated heating device 26.

The lower part of FIG. 2 illustrates various signal profiles, wherein the time t is plotted on the abscissa and the temperature T is plotted on the ordinate. Here, the reference designation TG denotes the freezing temperature of the reducing agent 19. In the case of a commercially available aqueous urea solution (eutectic 32.5% solution), said value is −11.5° C.

The checking of the temperature sensor 18 begins at a time t0 at which both conditions for the enabling of the check are satisfied. Firstly, the temperature T is considerably higher than the freezing temperature TG of the reducing agent 18, whereby no heating of the reducing agent 18 is required for the correct functioning of the exhaust-gas aftertreatment system 5, and secondly, the signal of the temperature sensor 18 has been approximately constant for an adequately long time period Δt1 before said time t0. The heating device 26 is accordingly activated at the time t0.

Since the temperature sensor 18 is arranged on a part of the supply line 16 downstream of the heating device 26, a temperature rise is expected after the activation of the heating device 26 at the time t0 if the temperature sensor 18 is functioning correctly. As a result of the activation of the heating device 26, the medium, reducing agent 19, is heated and the introduction of heat results in a positive temperature change which can be measured by the temperature sensor 18.

The elapsed time duration until the signal of the temperature sensor, proceeding from a start temperature T0 at the time t0, has changed in the direction of a higher temperature by a predefined expected value ΔT is therefore checked. A typical profile of the temperature signal of a fault-free temperature sensor 18 is denoted in the lower half of the diagram in FIG. 2 by a solid line L1. The signal profile L1 is characterized by a fast rise, such that the expected value ΔT is reached within a time period Δt2. In the case of a fault-free temperature sensor 18, the temperature signal L1 falls quickly again, within the time period Δt3, after the deactivation of the heating device 26 at the time t1.

If the expected value ΔT is reached not within the time period Δt2 but only, after a relatively long time period Δt4, at a later time t2, which is reflected in a slight rise of the sensor signal (lines L2, L3), this may be because of an incorrectly operating temperature sensor 18 or may be the result of excessively low heating power of the heating device 26. To be able to rule out the latter situation, the profile of the temperature signal after the deactivation of the heating device 26 is also checked.

If the temperature drop after the deactivation of the heating device 26 at the time t2 is faster than the temperature rise, it is inferred that there is a defect of the heating device 26, in particular excessively low heating power of the heating device 26. Such a profile of the temperature signal is indicated in the lower part of the diagram on the figure by a dashed line L2. The temperature signal approximately reaches the initial value again, that is to say the start temperature T0, already at a time t3. By contrast, if the temperature drop after the deactivation of the heating device is likewise slow (line L3), it is inferred that the temperature sensor 18 is faulty. The temperature signal approximately reaches the initial value again, that is to say the start temperature T0, only at a later time t4.

If the expected value ΔT is not reached even within the relatively long time period Δt4, it is inferred that the temperature sensor 18 is "stuck". A "stuck" temperature sensor is to be understood in this context to mean that the measurement values have "frozen", such that the signal of the temperature sensor exhibits no dynamics or only insignificant dynamics.

The expected value ΔT is stored, as a function of the maximum heating power of the heating device 26, in a characteristic map in the data memory 30.

In the event of faults of the temperature sensor 18 or of the heating device 26 being identified, an entry is recorded in a fault memory within the dosing control unit 9 or within the control device 6 of the internal combustion engine 1. Furthermore, in the event of a fault occurring, a corresponding signal can be output to the driver of the vehicle that is driven by way of the internal combustion engine by way of a fault display device.

The method has been discussed on the basis of an example in which the heating duration until a desired temperature rise has occurred is monitored, and the temperature sensor is regarded as being defective if the heating duration is too long. Alternatively, it is also possible for the temperature rise in the case of a fixedly predefined heating duration to be monitored and evaluated. In this case, the temperature sensor is regarded as being defective if the temperature rise within said time duration is too small, that is to say remains below a predefined expected value.

LIST OF REFERENCE DESIGNATIONS

1 Internal combustion engine
2 Intake line
3 Injection system
4 Exhaust line
5 Exhaust-gas aftertreatment system
6 Control device, engine control unit (ECU, electronic control unit)
7 Bus system, data and control line
8 Reduction catalytic converter, SCR catalytic converter
9 Dosing control unit, DCU
10 Reducing agent storage vessel
11 Electric reducing agent pump
12 Electric heating device of the reducing agent storage vessel
13 Fill level sensor
15 Dosing device, injection valve
16 Supply line
18 Temperature sensor
19 Reducing agent
20 Extraction line
26 Electric heating device
27 Pressure sensor
28 Processing unit, processor
29 Program memory
30 Data memory (value memory)
KST Fuel
T Temperature
TG Freezing temperature of the reducing agent
T0 Start temperature of diagnosis
t Time
t0 Time of the start of the diagnosis, heating device ON
t1,t2 Time of heating device "OFF"
t3,t4 Time
Δt1 Time period before the start of the diagnosis
Δt2, Δt3, Δt3 Time period
ΔT Expected value
L1 Signal profile of fault-free temperature sensor
L2 Signal profile of defective heating device
L3,L4 Signal profile of defective temperature sensorPatent

The invention claimed is:

1. A method for checking the signal of a temperature sensor in an exhaust-gas aftertreatment system for an internal combustion engine, wherein the exhaust-gas aftertreatment system has at least a reduction catalytic converter, a reducing agent storage vessel for storing liquid reducing agent, a reducing agent pump, a dosing device for introducing the reducing agent into an exhaust line of the internal combustion engine, a supply line for supplying the reducing agent liquid from the reducing agent pump to the dosing device, and an electric heating device for heating at least a part of the reducing agent, wherein the temperature sensor is arranged in the exhaust-gas aftertreatment system downstream of the heating device as viewed in the flow direction of the reducing agent, the method comprising:
   a) in an operating state of the internal combustion engine in which no heating of the reducing agent is required owing to the prevailing temperatures, activating the heating device for the purpose of checking the temperature sensor,
   b) determining whether the signal of the temperature sensor, proceeding from a start temperature (T0), changes by a predefined expected value ($\Delta T$) within a predefined time period ($\Delta t2$) upon activation of the heating device,
   c) provisionally identifying the temperature sensor as fault-free if the expected value ($\Delta T$) is reached within the predefined time period ($\Delta t2$),
   d) deactivating the heating device,
   e) determining whether the signal of the temperature sensor, proceeding from the expected value ($\Delta T$), reaches the start temperature (T0) again within a time period ($\Delta t3$), and
   f) confirming the temperature sensor as fault-free if the start value (T0) is reached within the predefined time period ($\Delta t3$).

2. The method as claimed in claim 1, further comprising identifying the temperature sensor as "faulty" if the expected value ($\Delta T$) is reached not within the predefined time period ($\Delta t2$) but only at a later point in time after the expiry of a further time period ($\Delta t3$), and the temperature drop after deactivation of the heating device proceeds with a gradient substantially equivalent to a gradient of the temperature rise.

3. The method as claimed in claim 1, further comprising identifying inadequate heating performance of the heating device if the expected value ($\Delta T$) is reached not within the predefined time period ($\Delta t2$) but only at a later point in time after the expiry of a further time period ($\Delta t3$), and the temperature drop after deactivation of the heating device takes place with a gradient faster than a gradient corresponding to the temperature rise.

4. The method as claimed in claim 3, further comprising identifying a temperature sensor as "faulty" with regard to absent or inadequate dynamics if the expected value ($\Delta T$) is not reached within the time period ($\Delta t3$).

5. The method as claimed in claim 1, wherein the check is initiated if the signal of the temperature sensor is at least approximately constant over a predetermined time duration ($\Delta t1$).

6. The method as claimed in claim 1, wherein the expected value ($\Delta T$) is selected in a manner dependent on a maximum heating power of the heating device.

7. The method as claimed in claim 6, wherein the expected value ($\Delta T$) is stored in a characteristic map of a data memory of a dosing control unit which controls and regulates the exhaust-gas aftertreatment system.

* * * * *